Dec. 5, 1967     H. W. ANGELERY     3,356,827
TEMPERATURE CONTROL SYSTEM FOR ELECTRODE
TYPE WATER HEATER
Filed Aug. 12, 1965

INVENTOR
HENRY W. ANGELERY
BY
HIS ATTORNEYS

# United States Patent Office 3,356,827
Patented Dec. 5, 1967

3,356,827
TEMPERATURE CONTROL SYSTEM FOR
ELECTRODE TYPE WATER HEATER
Henry W. Angelery, 19 Gwynne Court,
Closter, N.J. 07624
Filed Aug. 12, 1965, Ser. No. 479,147
7 Claims. (Cl. 219—286)

ABSTRACT OF THE DISCLOSURE

An improved water heater having at least one pair of electrodes to which current is supplied for heating liquid supplied to and withdrawn from a receptacle and in which the liquid also is circulated, and a device including a temperature-responsive member for integrating the temperature of water supplied to the receptacle and the liquid circulating in the receptacle, the heating effect of the electrodes being modulated by a shutter movable between and relative to the electrodes and controlled by means of an expansible bellows connected to the temperature-responsive device and a lever system interposed between the bellows and a lever which carries the shutter.

---

Figure 1:
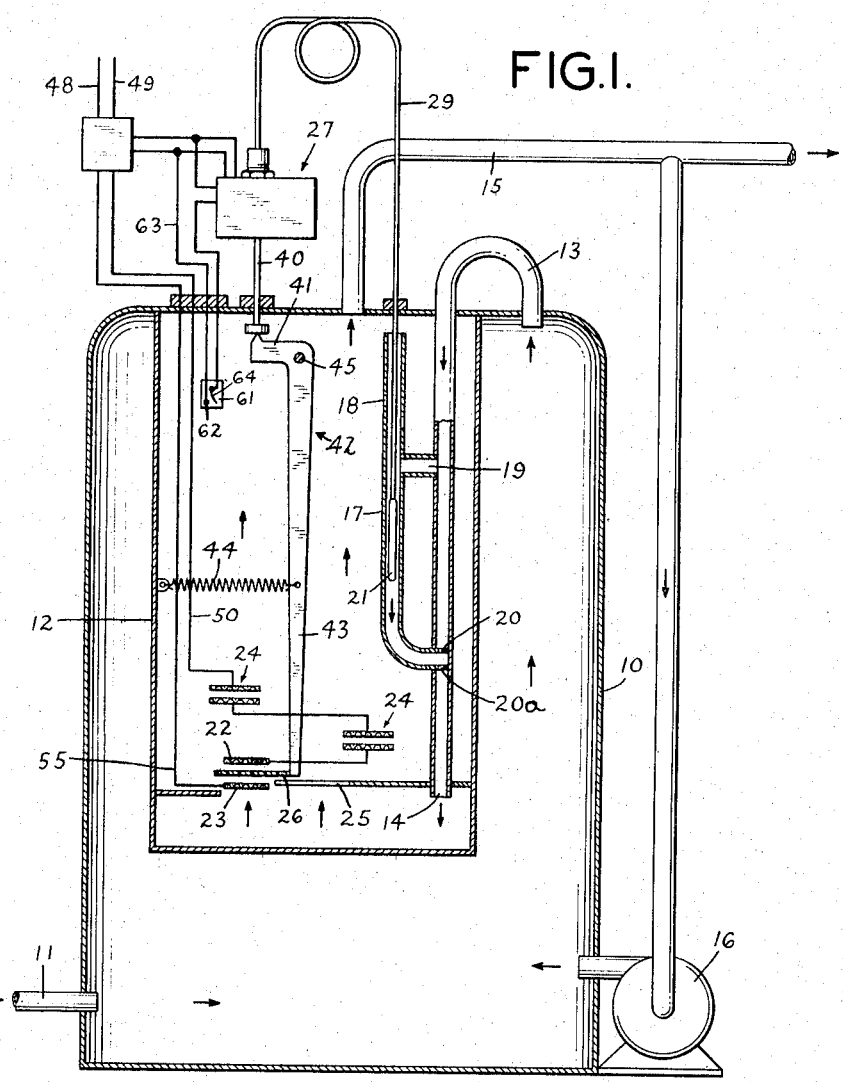

This invention relates to improvements in water heaters and more particularly to electric water heaters and electric heating units for such water heaters.

The presently available electric water heaters include a tank having conduits for supplying cold water to and withdrawing hot water from the tank, one or more resistance heating units and a thermostatically operated switch, by means of which current can be supplied to or shut off from the resistance heating unit. When the temperature of the water in the tank decreases below a certain predetermined value, the thermostatic switch closes and current is supplied to the heating unit. Inasmuch as the resistance heating units commonly used have a high current drain, a heavy surge of current occurs which is maintained at a maximum until the temperature rises sufficiently to cause the thermostatic switch to open. The current supply is then abruptly terminated. As a result, the normal operation of the conventional electric water heater causes intermittent heavy surges of current and wide fluctuations in the temperature of the water being withdrawn from the tank.

In some larger installations, surging of the electrical current can be minimized by the use of relays and time delay switches. This, however, makes the control of temperature of the water supplied by the tank even less dependable and causes even wider fluctuations in the temperature of the water. In neither case is the electric current flow reduced to the lowest possible mean average quantity, i.e., the smallest magnitude or amplitude between the highest and lowest value of current flow.

In accordance with the present invention, heating elements and water heaters are provided which are capable of supplying water at a substantially uniform output temperature despite intermittent or variable rates of flow of the water and in which the flow of electric current is reduced to the lowest possible mean average value, whereby large surges in the electric current flow and sudden changes in water temperature will not occur.

More particularly, in accordance with the present invention, the heating unit for water heaters embodying the present invention includes one or more pairs of electrodes disposed in the heater tank in contact with the water and supplied with current so that flow of current through the water between the electrodes will cause heating of the water. Control of the flow of current between the electrodes is provided by means of an insulating shutter or vane which can be moved relative to the electrodes to increase or decrease the area of the current flow path between the electrodes and thereby regulate the flow of current to provide a graduated heating action. The heating action is controlled by a temperature-responsive means arranged so that the amount of heat supplied by the heating unit is substantially proportional to the heating requirements of the water entering and being discharged from the tank despite the fact that flow may be intermittent or the rate of flow may vary widely in accordance with the demand on the system.

In a typical system, the current flow between the electrodes, under the control of the shutter or vane member, is responsive to the temperature of the water in the tank and the temperature of incoming water, in the manner shown in my U.S. Patent No. 2,713,994, granted July 26, 1955. By the use of an integrating temperature-responsive means, as disclosed in Patent No. 2,713,994, a very close regulation of the current or power flow through the electrodes is obtained so that the heating unit is quickly responsive to an increased demand on the system and yet can control the power so that when no demand for water exists the current flow is reduced to a minimum sufficient to maintain a selected temperature in the system or completely shut off. The new system can be provided with limit control thermostatic means for shutting off the current supplied to the electrodes completely, if overheating occurs. Moreover, additional or satellite heating units of the type generally described above but lacking the shutter control can be provided, these electrodes being connected in series with the shutter-controlled electrodes and indirectly responsive to operation of the shutter. By the use of a master heating unit and satellite heating units, large water heaters can be provided having a large heating capacity without the need of separate controls for all of the heating units.

Figure 2:
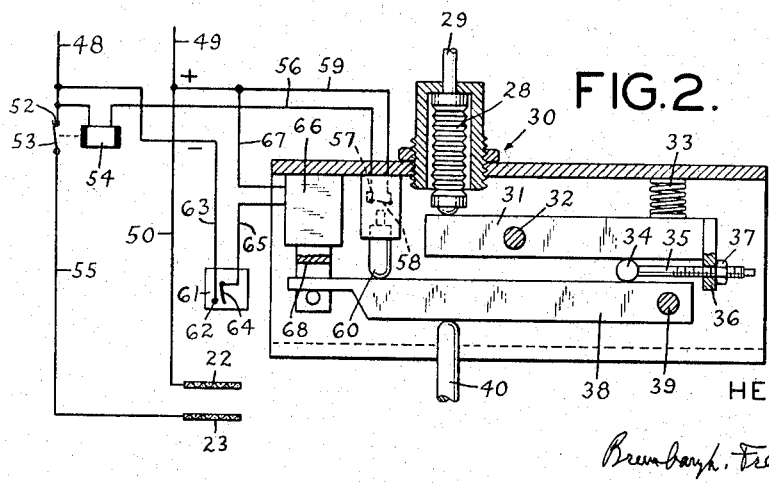

For a better understanding of the present invention, reference may be had to the accompanying drawings in which:

FIGURE 1 is a schematic illustration in vertical section showing a typical water heater embodying the present invention; and FIGURE 2 is a sectional view of an integrating control for the heating unit with the electrical connections shown schematically.

An illustrative example of a water heater embodying the present invention includes an outer shell or tank 10 which is supplied with cold water by means of a conduit or pipe 11. The tank or shell 10 can be provided with insulating cover, not shown. Within the tank 10 is a smaller tank 12 which is connected to the outer tank by means of a conduit 13 extending substantially vertically in the tank 12 and having an open end 14 spaced from the bottom of the tank. An outlet conduit 15 is connected with the top of the inner tank 12 so that water can be wihdrawn therefrom on demand. A circulating pump 16 withdraws water from conduit 15 or the inner tank 12 and introduces it into the tank 10 thereby causing a circulation through the tanks 10 and 12.

The conduit 13 forms a part of an integrating heat computer of the type disclosed more particularly in my Patent No. 2,713,994. The computer includes a second conduit 17 which is open at its upper end and has other inlet openings 18 therein spaced above a bypass conduit 19 which connects the conduits 13 and 17. The lower end of the conduit 17 also connects with the conduit 13 which is provided with restricted passages 20 and 20a which form an aspirating device to induce flow of water from the tank 12 by the energy of the fluid flow through conduit 13 and discharging the mixture through outlet 14. The pressure drop across the restricted passage 20 induces a flow of part of the fluid in conduit 13 to flow through conduit 19 and mixing with the fluid in conduit 17. The thermostat bulb 21 containing an expansible liquid is disposed below the bypass conduit 19 and senses the temperature of the mixture of the fluids. The purpose of the conduit system described above is to anticipate demand and render the thermostat bulb 21 responsive to both the temperature of the water in the tank 12 and the incoming water from the tank 10.

In accordance with the invention, electric heating means of novel type is provided for heating the water or other liquid entering the tank 12. As shown in FIGURE 1, the heating elements may comprise a pair of spaced-apart electrodes 22 and 23 which are of grid-like form and may be composed of wire mesh, perforated plates or parallel bars arranged in such spaced relation that an alternating electric current imposed on the electrodes will cause a current flow through the liquid with resulting heating of the liquid. It has been found that with electrodes of relatively small area, for example 4 inches square spaced about 1/16 inch apart with 220 volt supply about 20,000 watts of power can be passed therebetween so that relatively rapid heating of the water can be obtained with small electrodes. The electrodes 22 and 23 are disposed in an opening in a baffle 25 which spans the tank 12 above its bottom. Other pairs of satellite electrodes 24 and so forth can be connected in series or series parallel with the electrodes 22 and 23 to enable heating of the water in different zones throughout the tank 12.

In order to control the rate of flow of current between the electrodes and their heating action, an insulating shutter or vane 26 is interposed between the electrodes 22 and 23 and can be withdrawn partially or completely from between them to modify the current flow between the electrodes. When the vane or shutter 26 is disposed between the electrodes 22 and 23 in the position shown in FIGURE 1, a very low rate of flow of current takes place with a low heating effect. As the shutter or vane 26 is withdrawn, exposing more and more of the electrodes 22 and 23 in direct opposition, the current flow and heating action increase, attaining a maximum when the shutter or vane 26 is completely withdrawn. Advantage is taken of the modulating action of the shutter to produce a very precise and accurate control of water heating. It will be understood that more than two electrodes can be provided in a heating unit, as for example when 3-phase current is supplied and an appropriate number of vanes (more than one) may be included to modulate current flow between the opposed electrodes.

Referring now to FIGURE 2, the control unit 27 for the heating unit vane includes a bellows 28 which is connected by means of the conduit 29 to the thermostat bulb 17 so that expansion and contraction of the liquid in the bulb 17 causes an expansion and contraction of the bellows 28. The bellows is mounted in a suitable casing 30 and its lower end bears against a lever 31 mounted on a pivot 32 in the casing 30. The lever 31 is biased in a clockwise direction by means of a spring 33 bearing against the casing 30 and the right-hand end of the lever 31. Connected to the right-hand end is a fulcrum member 34 of cylindrical shape on a threaded shaft 35 extending through a downwardly extending flange 36 on the lever 31. The fulcrum 34 can be adjusted lengthwise of the lever 31 by means of an adjusting nut 37 threaded on the shaft and engaging the flange 36. A lower lever 38 engages the fulcrum 34 and is mounted at its right-hand end on a pivot 39. With this lever relationship, clockwise movement of the lever 30 by means of the spring 32 and contraction of the bellows 28 will cause a counterclockwise movement of the lever 38 around its pivot 39. Expansion of the bellows 28 will cause clockwise rocking of the lever 38.

Bearing against the underside of the lever 38 is a pin or thrust rod 40 which engages a laterally extending arm 41 on a bell crank lever 42, as shown in FIGURE 1.

The lever 42 has a downwardly extending elongated arm 43 which carries the shutter or vane 26 at its lower end. A spring 44 normally biases the lever 42 in a clockwise direction about a supporting pivot 45 adjacent the upper end of the arm 43 and at ahe same time forces the pin 40 upwardly against lever 38 and maintains it in engagement with the fulcrum 34. From the foregoing, it will be apparent that expansion and contraction of the bellows will produce a rocking movement of the lever 42. As the temperature of the heater in contact with the thermostat 21 increases, the bellows 28 will expand, the lever 38 will move clockwise and the spring 44 will cause clockwise movement of the shutter or vane 26 toward the left as viewed in FIGURE 1, reducing the flow of current between the electrodes 22 and 23. Contraction of the bellows 28 due to a lower water temperature will cause a reverse operation such that the shutter 26 is moved to the right exposing a greater area of the electrodes 22 and 23 in direct opposition and enabling an increased current flow and increased heating action. Thus, the amount of current flowing between the electrodes 22 and 23 is dependent upon the temperature of the water flowing through the conduit 17. By combining the temperature of the incoming water from the outer tank and the water in the tank 12, a mean average flow of current flow through the heating unit is maintained to keep the temperature of the water being discharged through the outlet pipe 15 substantially uniform and independent of intermittent use or varying flow rates.

The manner in which the flow of current to the electrodes 22 and 23 and the satellite electrodes 24 is controlled will now be described.

As shown in FIGURES 1 and 2, the heating units are supplied with current from a power source by means of conductors 48 and 49, the conductor 49 as shown in FIGURE 2 being connected by means of a conductor 50 to one or more pairs of opposed satellite electrodes 24 connected in series with the electrodes 22 and 23. If desired, the satellite electrodes 24 can be omitted and the electrode 22 connected directly to the conductor 50. The conductor 48 is connected to one fixed contact 52 of a relay switch having a normally open, movable contact 53 and a relay coil 54 which, when energized, causes the contacts 52 and 53 to engage thereby supplying current through the conductor 55 to the electrode 23 to complete the circuit therethrough. As shown in FIGURE 2, one terminal of the coil 54 is connected to the conductor 48 and the other terminal is connected by means of a conductor 56 to a fixed contact 57 of a normally closed single throw switch having a movable contact 58 connected by means of a conductor 59 to the power source conductor 49 thereby completing a circuit through the coil 54 and causing current to be supplied to the electrodes 22 and 23 and satellite electrodes 24.

In order to disconnect the current source when the shutter or vane 26 is interposed between the electrodes 22 and 23 and the temperatume of the water in the tanks attains a predetermined value, for example 180° F., the switch contacts 58 and 59 can be disengaged by a switch button or plunger 60. The lever 38 engages the plunger 60 and at a predetermined maximum water temperature the plunger 60 engages the movable switch blade 58 and moves it out of engagement with the contact 57 thereby interrupting the circuit through the relay coil 54 and allowing the contacts 52 and 53 to disengage so that current is no longer supplied to any of the heating electrodes.

As a further control, in the event that any damage should occur to any of the components of the heating unit and the temperature of the water rises to an undesirably high value, the heater is provided with a thermostatic switch 61 which causes the relay coil 54 to be de-energized in the following manner. As shown in FIGURE 2, a fixed contact 62 of the thermostatic switch 61 is connected by means of a conductor 63 to the conductor 48.

The other bi-metallic contact 64 of the switch 61 which is normally out of engagement with the contact 62 is connected by means of a conductor 65 to one terminal of a solenoid coil 66, its other terminal being connected by means of a conductor 67 to the conductor 49. A slidable armature 68 in the solenoid is connected to the lever 38 so that when the lever 38 is lifted by energization of the solenoid coil 66, the plunger 60 is also raised and disengages the contacts 57 and 58 thereby de-energizing the relay coil 54. In this way, closing or the contacts 62 and 64 of the thermostat 61 at a predetermined maximum temperature, for example 200° F., shuts off the supply of current to the heating electrodes, even if the other control elements of the heater should be damaged or ineffective.

It will be apparent that fluctuations in temperature of the water are further minimized due to the fact that the water in the tanks 10 and 12 is circulated by the circulating pump and, moreover, radiation or conduction of heat will take place through the walls of the tank 12. In this way a large variation in the temperature of the water flowing through the temperature-integrating unit in contact with the thermostat bulb 17 usually does not occur and, moreover, during times of little or no demand, additional heat is stored in the tank 10 and is ready upon demand without substantial additional heating. Forced circulation of the liquid through the opening in the baffle 25 and around the electrodes overcomes any tendency of the liquid to stagnate around the electrodes and be vaporized with the resulting interruption of current flow. In other words, circulation of the liquid and movements of the modulating vane 26 or vanes reduce current surges and interruptions. Moreover, the stored heat reduces the demand for heat supplied by the heating units, even when a heavy demand on the water supply occurs, so that the heating units will not cause heavy current surges.

It will be understood that variations in the arrangement and relationship of the parts of the heater and modifications thereof are within the scope of the invention as defined in the following claims.

I claim:

1. In a liquid heater having a receptacle for liquid, means for supplying liquid to said receptacle, means for withdrawing liquid from said receptacle and means for integrating the temperature of liquid supplied to said receptacle and liquid in said receptacle including a temperature-responsive device; the combination therewith of at least one pair of spaced-apart electrodes in said receptacle for contact with liquid in said receptacle, means for supplying electrical current to said electrodes for flow through the liquid therebetween to heat said liquid, at least one insulating shutter member movable between and relative to said electrodes to modulate flow of electrical current between said electrodes, a pivoted lever carrying said shutter, a bellows connected to said temperature-responsive device and expansible and contractible by said temperature-responsive device, and lever means movable by said bellows interposed between said bellows and said lever for moving said lever in response to expansion and contraction of said bellows.

2. In the liquid heater set forth in claim 1, switch means for connecting and disconnecting said electrodes and said means for supplying electrical current, and means actuated by said lever means for disconnecting said electrodes and said means for supplying electrical current when said liquid is heated to a predetermined temperature.

3. In the liquid heater set forth in claim 1, thermostatic switch means in said receptacle for contact with the liquid therein, solenoid means energized by said thermostatic switch means at a predetermined high temperature and de-energized thereby at a lower temperature, a switch normally connecting said electrodes and said means for supplying electrical energy and actuatable by said lever means to disconnect said electrodes and said means for supplying electrical energy, and means responsive to energizing of said solenoid means for actuating said lever means to actuate said switch.

4. In the liquid heater set forth in claim 1 in which said lever means comprises a second lever pivoted at about its middle having one end portion engaging said bellows, means biasing said second lever into engagement with said bellows, an adjustable fulcrum member at the other end of said second lever, a third lever pivotally mounted at one end and engageable between its ends with said fulcrum member, and means interposed between said shutter-carrying lever and said third lever for moving said shutter carrying lever in response to expansion and contraction of said bellows.

5. In the liquid heater set forth in claim 1, at least one pair of spaced-apart satellite electrodes in said receptacle and electrically connected with the first-mentioned electrodes and said means for supplying electrical energy.

6. In the liquid heater set forth in claim 1, a plurality of pairs of spaced-apart satellite electrodes in said receptacle, said satellite electrodes being electrically connected with the first-mentioned electrodes and said means for supplying electrical energy.

7. In the liquid heater set forth in claim 1, thermostatic switch means in said receptacle for contact with liquid therein and responsive to a predetermined maximum temperature of said liquid for interrupting supply of current to said electrodes.

References Cited

UNITED STATES PATENTS

| | | | |
|---|---|---|---|
| 1,023,602 | 4/1912 | Wallmann | 219—284 |
| 1,550,164 | 8/1925 | Heinrich | 219—285 |
| 1,760,230 | 5/1930 | Crawley | 219—286 |
| 2,387,103 | 10/1945 | Wicks | 219—287 |
| 2,631,218 | 3/1953 | Alden | 219—284 X |
| 2,663,788 | 12/1953 | Tatem | 219—290 |
| 2,688,686 | 9/1954 | Johnson | 219—295 |
| 2,713,994 | 7/1955 | Angelery | 165—36 |
| 3,053,964 | 9/1962 | Foley et al. | 219—284 X |
| 3,138,696 | 6/1964 | Eaton | 219—286 |
| 3,219,796 | 11/1965 | Graf et al. | 219—285 |

FOREIGN PATENTS

| | | |
|---|---|---|
| 745,064 | 2/1933 | France. |

ANTHONY BARTIS, *Primary Examiner.*